UNITED STATES PATENT OFFICE.

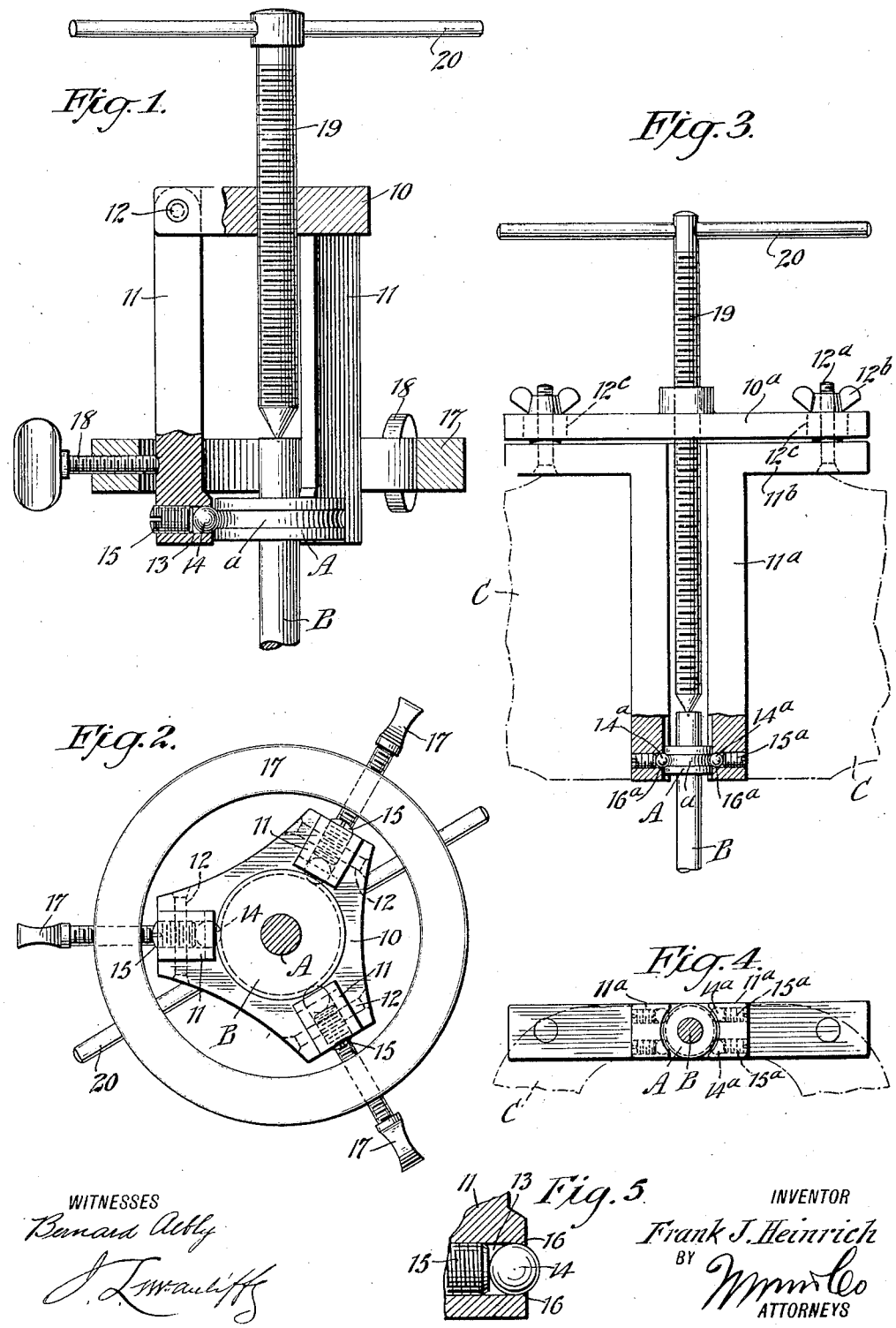

FRANK JOSEPH HEINRICH, OF YAKIMA, WASHINGTON.

BEARING-PULLER.

1,346,023.  Specification of Letters Patent.  Patented July 6, 1920.

Application filed June 24, 1919. Serial No. 306,363.

*To all whom it may concern:*

Be it known that I, FRANK JOSEPH HEINRICH, a citizen of the United States, and a resident of Yakima, in the county of Yakima and State of Washington, have invented a new and Improved Bearing-Puller, of which the following is a description.

My invention relates to a device for pulling a bearing from its shaft, more particularly a race-forming bearing.

The invention especially relates to a device adapted for pulling magneto and small generator bearings.

The general object of the invention is to provide a bearing puller improved in various particulars especially as regards the means provided for engaging the bearing whereby to securely grip the bearing and be maintained in position against the tendency to slip and disengage the bearing under the pressure exerted endwise against the shaft. Also, the race cannot be scarred, the engaging member is readily renewable if broken, and the device can be readily adjusted to different sized bearings within the range of its capacity.

The above and other objects are attained by the novel puller, the distinctive structural features and the mode of functioning of which will clearly appear from the specific description following.

Reference is to be had to the accompanying drawings forming a part of this specification, it being understood that the drawings are merely illustrative of one example of the invention.

Figure 1 is a sectional plan view of a bearing puller embodying my invention;

Fig. 2 is a front end view;

Fig. 3 is a plan view showing a puller of somewhat different form embodying my invention, parts being sectioned;

Fig. 4 is a front end view of the puller shown in Fig. 3;

Fig. 5 is an enlarged detail view showing in section the manner of seating the gripping ball.

Referring more particularly to the form of puller shown in Figs. 1, 2 and 5, a head 10 is provided and a plurality of elongated gripping members 11 are pivoted at their rear ends to said head as indicated at 12 to swing laterally to vary the distance between the front ends for accommodating bearings of different sizes. In the forward end of each member 11 a transverse bore 13 is formed and the inner end of each bore is slightly contracted forming a seat 16 for a ball 14, the ball being backed by a screw 15 to hold the ball to its work and permitting of the ball being removed by backing out the screw in case the ball should become broken or damaged. The ball seat 16 which is shown best in Fig. 5 permits of the ball projecting from its carrying member 11 sufficiently to engage in the race $a$ of the bearing. A frame 17 is provided, here shown as arranged to extend about the several gripping members 11. Said frame is provided with radially disposed screws 18 adapted at their inner ends to bear against the backs of the respective members 11 to take the stress set up by the pressure screw 19 which engages a threaded bore in the head 10 and is provided with a suitable handle 20, said screw being adapted to exert pressure endwise against the shaft B carrying the bearing to strip the bearing from the shaft. The balls 14 constitute most effective engaging elements to firmly grip the bearing and should a ball become broken its renewal can be quickly accomplished.

In the form shown in Figs 3 and 4 the longitudinally ranging members 11$^a$ instead of being pivoted as are the members 11, have lateral arms 11$^b$ at their rear ends and bolts 12$^a$ are adapted to pass through the same and through slots 12$^c$ in the head 10$^a$, through which the pressure screw 19 passes. The elements 14, 15$^a$, 16$^a$ are the same as the elements 14, 15, 16, except that they are arranged in pairs, there being a pair in each arm 11$^a$ to engage opposite sides of the bearing A.

The arms 11$^a$ are adapted to be clamped to the jaws of a vise indicated at C by dotted lines to cause the balls to grip the race $a$ of the bearing A. The vise as will be readily understood receives the lateral stress set up by the pressure screw 19.

I would state in conclusion that while the illustrated example constiutes a practical embodiment of the invention, I do not limit myself strictly to the mechanical details herein illustrated, since manifestly the same can be considerably varied without departure from the spirit of the invention as defined in the appended claims.

Having thus described my invention, I claim as new and desire to secure by Letters Patent:

1. A bearing puller including members adapted to be positioned for gripping a bearing, and balls on said members adapted to engage in the race of the bearing; together with means to exert endwise pressure on the element carrying the gripped bearing.

2. A bearing puller including members adapted to be positioned for gripping a bearing, and balls on said members adapted to engage in the race of the bearing, said balls being removably held in said members; together with means to exert endwise pressure on the element carrying the gripped bearing.

3. A bearing puller including members adapted to be positioned for gripping a bearing, said members having transverse bores contracted at their inner ends to present ball seats, and a ball in each of said bores at the seat thereof and projecting from the bore at the inner end to engage in the race of a bearing; together with means to exert endwise pressure on the element carrying the gripped bearing.

4. A bearing puller including members adapted to be positioned for gripping a bearing, said members having transverse bores contracted at their inner ends to present ball seats, and a ball in each of said bores at the seat thereof and projecting from the bore at the inner end to engage in the race of a bearing; together with screws in said bores and backing the balls thereof to hold the latter to their work and permit their removal when required, and means to exert endwise pressure on the element carrying the gripped bearing.

5. A bearing puller including gripping members adapted to be positioned for engagement with a bearing and laterally adjustable to suit a bearing of given size, said members having means to engage the bearing, means to exert endwise pressure on the shaft carrying the bearing, a frame adapted to be positioned adjacent to said members, and adjustable devices on said frame to engage said members to take up the lateral stress set up by the pressure means.

6. A bearing puller including a pair of members adapted to be positioned for gripping a bearing and relatively movable to accommodate therebetween a bearing of a given size, said members being adapted to be clamped in a vise, pairs of balls on said members projecting from the inner face thereof to engage in the race of the bearing to be pulled, and means to exert longitudinal pressure on the shaft carrying the bearing.

FRANK JOSEPH HEINRICH.